Feb. 7, 1967 W. HOFFMANN ETAL 3,302,987
MULTI-ROW CYLINDRICAL ROLLER BEARINGS
Filed May 22, 1964 2 Sheets-Sheet 1
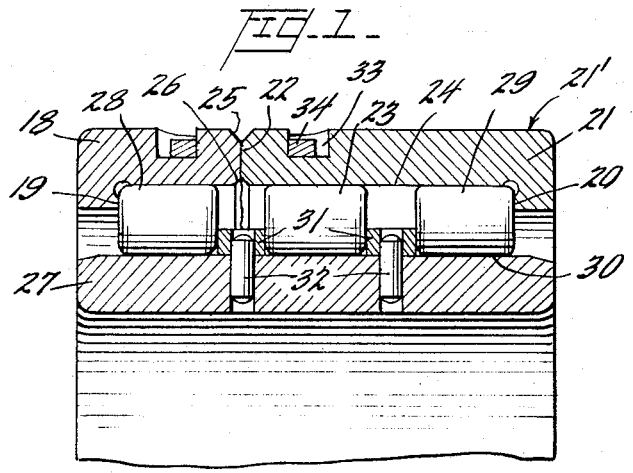
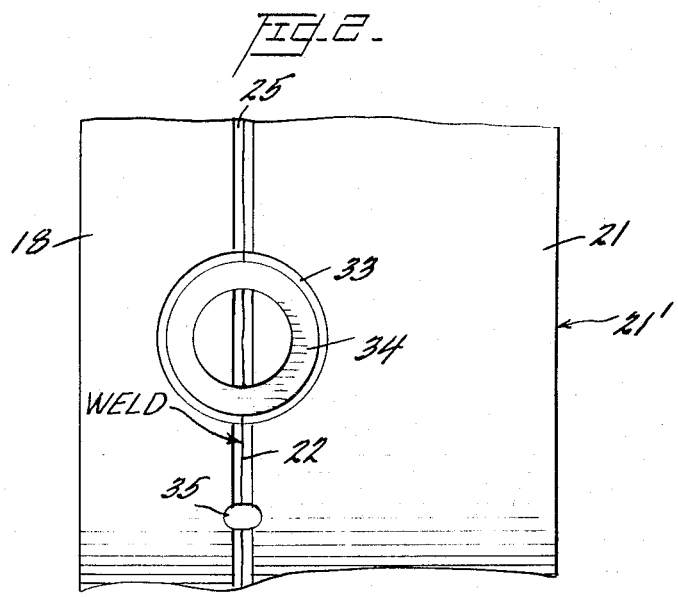
INVENTORS
Walter Hoffmann
Werner Jacob
BY Watson, Cole, Grindle & Watson
ATTORNEYS

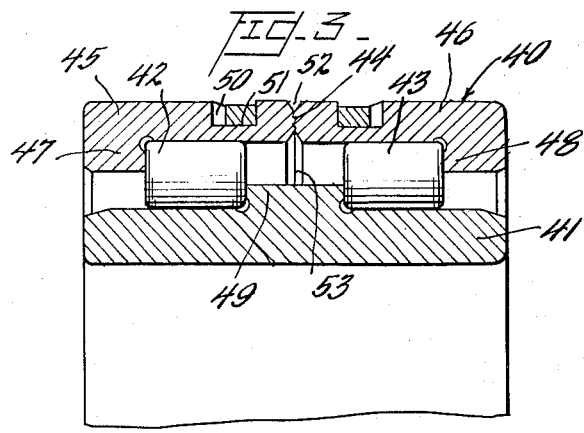
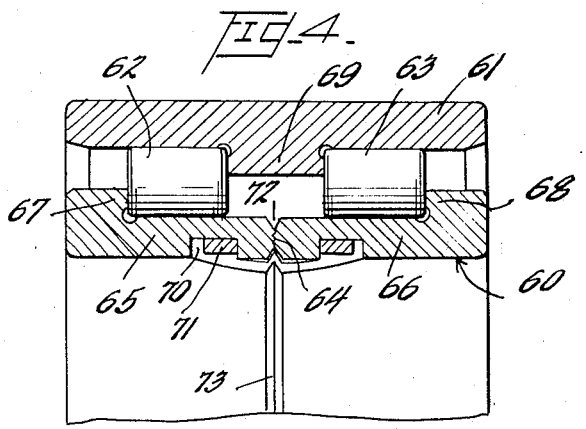

United States Patent Office 3,302,987
Patented Feb. 7, 1967

3,302,987
MULTI-ROW CYLINDRICAL ROLLER BEARINGS
Walter Hoffmann, Herzogenaurach, near Nurnberg, and Werner Jacob, Frankfurt am Main, Germany, assignors to Industriewerk Schaeffler OHG, Nurnberg, Germany
Filed May 22, 1964, Ser. No. 369,444
Claims priority, application Germany, Jan. 4, 1960, I 17,483
3 Claims. (Cl. 308—213)

This invention relates to multi-row cylindrical roller bearings, and is a continuation-in-part of application Serial No. 79,657, filed December 30, 1960, now abandoned.

Multi-row cylindrical roller bearings generally have rollers which are free, such bearings are therefore suitable for accepting radially acting forces but not axially acting forces. The roller elements are guided between rims on the inner or outer race. If multi-row cylindrical roller bearings are also to be used for transmitting axial forces, rims must be arranged both on the inner and on the outer race. The use of loose rim discs or angle rings is also possible. The lateral rims can be connected fast to the races after being inserted therein, but this entails considerable manufacturing difficulties since it is a question of hardened parts which have to be first of all provided with bores, screw-threads, grooves, etc., which may become distorted under heat treatment.

With cylindrical roller bearings, the rolling elements are guided with slight lateral play between rims. Therefore, in the case of multi-row cylindrical roller bearings which are adapted to accept axial forces also, it is necessary to manufacture the parts with extreme accuracy. But since this is particularly difficult, the individual parts often have to be subsequently processed, wherever this may still be possible. This kind of manufacturing process and assembly is very expensive and time-wasting.

It is an object of the invention to provide a roller bearing which will withstand axial forces in a single row of cylindrical rollers and which can be produced with great accuracy in such a way that the race ways of the individual rows of rollers will accommodate roller elements which are identical to one another so that rollers of the same category may be used throughout a single bearing.

In accordance with the invention in a plural race roller bearing in which the rollers run between stationary rims on polished running surfaces, one of the race ways is made first in one part and then in a plurality of parts to be joined together with two race rims while the other race way is provided with the rims to maintain the roller rows separate from each other. In this way, it is attained that one race way with side rims is made of one piece with a parting joint at right angles to the longitudinal axis and this joint is forced apart by a force between the joint so that the bearing part will divide into two parts. The parted parts are held together by one or more ring members or by welding.

In order to aid in separating the two parts of the race it is contemplated to provide annular grooves at the parting joint which may be provided with a plurality of spaced holes to receive a wedging tool to force the two parts apart.

The parting joint is provided between adjacent race ways. In a three race way bearing, the parting joint is provided adjacent an inner row of rollers and an outer row so that thus the parting joint is unsymmetrical as to the bearing and the cylindrical roller bearings all roll on smooth surfaces.

The clamping rings, of which there are a plurality around the circumference, are each of small diameter and are embedded in the outer race.

A further object of the invention is to produce bearings which are accurate as to the distance between rows of bearing rollers so that a middle row of rollers contact a race way which is adjacent the parting joint of the outer portion.

For a better understanding of the invention and to show how the same may be carried into effect, reference may now be made, by way of example, to the accompanying drawing, in which:

FIG. 1 is an axial sectional view of a three-row cylindrical roller bearing;
FIG. 2 is a side view of part of the bearing according to FIG. 1;
FIG. 3 is an axial sectional view of a modified roller bearing; and
FIG. 4 is an axial sectional view of another modified roller bearing.

The drawing shows a three-row cylindrical roller bearing having an outer race 21' which is divided at right angles to its longitudinal axis into two parts 18 and 21, the parts abutting along a joint 22. The joint 22 is not arranged centrally of the race 21' but in a position axially displaced from the center of the race in order that a central row of rollers 23 can roll on an uninterrupted outer raceway 24. The outer race 18 and 21 has a groove 25 in its outer surface and a corresponding groove 26 in the outer raceway 18 and 21. This arrangement weakens the cross-section of the race 21' and predetermines the position of the joint 22 at which it is desired to separate or prize the outer race 21' into two parts. An inner race 27 is provided with rims for guiding the rows of rollers 23, 28 and 29 by way of rings 31 which are pressed on to the smooth continuous raceway 30 of the race 27 and are fastened by several circumferentially spaced pins 32. As shown in FIG. 2, the outer surface of the outer race 18 and 21, which is provided with the annular groove 25, is also provided with grooves 33 and containing rings 34. The annular groove 25 is interrupted at several points along its circumferential length by holes 35 into which conical pins are driven in order to force the race 21' open when the two parts 18 and 21 are prized apart.

The grooves 25 and 26 and the holes 35 can serve to convey lubricant to the rollers.

As shown in FIG. 1, the outer race part 18 is provided with a shoulder or circumferential abutment rim 19 against which the row of rollers 28 abut and a second shoulder 20 is provided on the outer race part 21 against which the row of rollers 29 abut.

The illustrated form of embodiment makes it possible to provide multi-row cylindrical roller bearings which are capable of accepting axial forces. These bearings can be produced with cages or may also be of the cageless type. The self-supporting construction with smooth continuous race ways and a race which can be forced open is particularly advantageous since the race ways for the individual rows of rollers are identical to one another in absolute dimensions and thus, rolling elements of the same category can be used throughout a single bearing.

As to the method of manufacturing the multi-row cylindrical roller bearings, the various steps may be followed in which both race rings 21' and 27 are each made in one piece and the race ring with the edge rims, which is the outer race ring 21', is prized into two parts by breaking the parts 21 and 18 apart at a weakened section 22, which extends perpendicular to the axis of the bearing at a parting joint. The rings 31 are mounted on the inner race ring 27 by means of pins 32 and then the rollers in three rows 23, 28 and 29 are placed on a smooth continuous race way 30 and finally the two parts 18 and 21 are secured together by placing rings 34 in the grooves 33 around the projecting portions of each ring part in order to hold the two parts together. The prizing of the two parts 18 and 21 is facilitated by means of the grooves 25 and 26 and also, the means of the radial holes, of which one is shown at 35 in FIG. 2, by insertion of a pin or tool into each hole 35 and this will aid in prizing the two parts apart.

Referring now to the roller bearing of FIG. 3, there is provided an outer race ring 40, an inner race ring 41 and two rows of rollers 42 and 43. The outer race ring 40 is made in one piece and is prized apart at the joint 44 into two parts 45 and 46 to assemble the bearing. The outer race ring 40 at its two axial ends, is provided with rims 47 and 48, and the inner race ring 41 is provided at its middle portion with a fixed rim 49 between the roller rows 42 and 43. The two parts 45 and 46 of the outer race ring 40 are held or secured together by means of grooves 50 in which rings 51 are secured, there being preferably a plurality of spaced rings 51. To facilitate the prizing of the two parts 45 and 46, circumferential grooves 52 and 53 are provided to weaken the outer ring 40 at the parting joint 44. In FIG. 3, which has the two rims 47 and 48, it is only possible to manufacture the bearing by prizing the ring 40 at 44 into two parts 45 and 46, since thus, it is possible to insert the two rows of rollers 42 and 43 on the inner ring 41 in such a way that both rows of rollers 42 and 43 will abut against the rim 49. In this way both parts 45 and 46 can be axially moved over the inner ring 41 until the rims 47 and 48 will abut against the rows of rollers. Then the two parts 45 and 46 are secured together by means of the rings 51.

FIG. 4 shows a bearing which differs from the bearing of FIG. 3 in the outer ring 6 has a single internal rim 69 centrally located and between the rows of rollers 62 and 63 and the inner ring 60 has end rims 67 and 68 to abut against the rows of rollers 62 and 63 respectively. The inner ring 60 has the two parts 65 and 66 which are prized apart at 64 and to facilitate separation of the two parts grooves 72 and 73 are provided. Securing rings 71 will hold the two parts 65 and 66 together.

The rims 47, 48 and 49 of FIG. 3 and the rims 67, 68 and 69 are preferably made integral with the inner and outer rings.

We claim as our invention:

1. Multi-row cylindrical roller bearing comprising an inner race ring, an outer race ring, three rows of rollers mounted between the race rings, the one race ring having rims at the outer edges of the ring to contact the first and third rows of rollers and the other race ring having a pair of spacing rings fastened thereon with one spacing ring between the first and second rows of rollers and the other spacing ring between the second and third rows of rollers, the said one race ring being prized apart at a parting seam extending perpendicularly to the axis of the bearing into two circumferential parts in contact with each other at the seam with the latter being provided between two rows of rollers, and clamping means on the one race ring to permanently secure the two parts adjacent to each other at the seam.

2. Multi-row cylindrical roller bearing according to claim 1, in which at least one pin is provided in each spacing ring and extending into the said other race ring to maintain the spacing ring in position on the race ring.

3. Multi-row cylindrical roller bearing comprising an inner race ring, an outer race ring, three rows of rollers mounted between the race rings, the one race ring having rims at the outer edges of the ring to contact the first and third rows of rollers and the other race ring having a pair of spacing rings fastened thereon with one spacing ring between the first and second rows of rollers and the other spacing ring between the second and third rows of rollers, the said one race ring being prized apart at a parting seam extending perpendicularly to the axis of the bearing into two circumferential parts in contact with each other at the seam with the latter being provided between two rows of rollers, and welding means on the one race ring to permanently secure the two parts adjacent to each other at the seam.

References Cited by the Examiner

UNITED STATES PATENTS

| | | | |
|---|---|---|---|
| 881,471 | 3/1908 | Hoffmann | 29—148.4 |
| 1,068,017 | 5/1913 | Stuebner | 308—213 |
| 1,289,827 | 12/1918 | Laycock | 308—213 |
| 1,338,939 | 5/1920 | Laycock | 308—213 |
| 1,495,564 | 5/1924 | Vincon | 308—196 |
| 1,675,728 | 7/1928 | Pierce | 308—196 |
| 1,783,791 | 12/1930 | Hughes | 29—148.4 |
| 1,953,550 | 4/1934 | Bruhl | 308—213 |
| 2,624,105 | 1/1953 | Virtue | 29—148.4 |

FOREIGN PATENTS

| | | |
|---|---|---|
| 345,206 | 4/1960 | Switzerland. |

EDGAR W. GEOGHEGAN, *Primary Examiner.*

FRANK SUSKO, *Examiner.*